United States Patent [19]

Tutelian

[11] Patent Number: 4,831,966
[45] Date of Patent: May 23, 1989

[54] APPARATUS FOR MOUNTING A CLOSURE ON A HOUSING OR THE LIKE AND A CONFINING ASSEMBLY

[76] Inventor: Clifford H. Tutelian, 2245 E. Samson, Fresno, Calif. 93706

[21] Appl. No.: 917,957

[22] Filed: Oct. 14, 1986

[51] Int. Cl.$^4$ ............................................. A01K 31/00
[52] U.S. Cl. ...................................... 119/17; 16/357; 16/358; 49/386; 14/58
[58] Field of Search ...................... 119/17, 21; 49/386; 14/66, 67, 68, 69, 50, 51, 52, 53, 58, 59; 298/6, 23 R, 23 S; 16/357, 358, 360

[56] References Cited

U.S. PATENT DOCUMENTS

| | | | |
|---|---|---|---|
| 402,799 | 5/1889 | Boddiker | 14/58 |
| 569,379 | 10/1896 | Hofmann | 16/367 |
| 673,380 | 5/1901 | Carter | 16/360 |
| 814,288 | 3/1906 | Hausfeld et al. | 16/360 |
| 814,355 | 3/1906 | Carter | 16/358 |
| 2,582,458 | 1/1952 | Rose | 49/386 |
| 2,584,173 | 2/1952 | Fowler | 16/357 |
| 3,001,225 | 9/1961 | Squire | 16/358 |
| 3,044,106 | 7/1962 | Papsdorf | 16/287 |
| 3,621,818 | 11/1971 | Johnston et al. | 119/17 |
| 4,163,344 | 8/1979 | Scherer | 49/386 |

Primary Examiner—Robert Peshock
Assistant Examiner—R. Thomas Price
Attorney, Agent, or Firm—Worrel & Worrel

[57] ABSTRACT

An apparatus for mounting a closure on a housing or the like, the apparatus having two arm members mounting the closure on the housing and each having a camming surface and a guide channel individually engaging a pivot pin and guide pin respectively borne by the housing and mounting the closure for movement between a recessed closed position and a recessed opened position relative to the housing. A confining assembly including a plurality of the housings aligned in a substantially horizontal row and having a single substantially flat panel extending beneath a plurality of the housings to serve as a floor therefor.

2 Claims, 3 Drawing Sheets

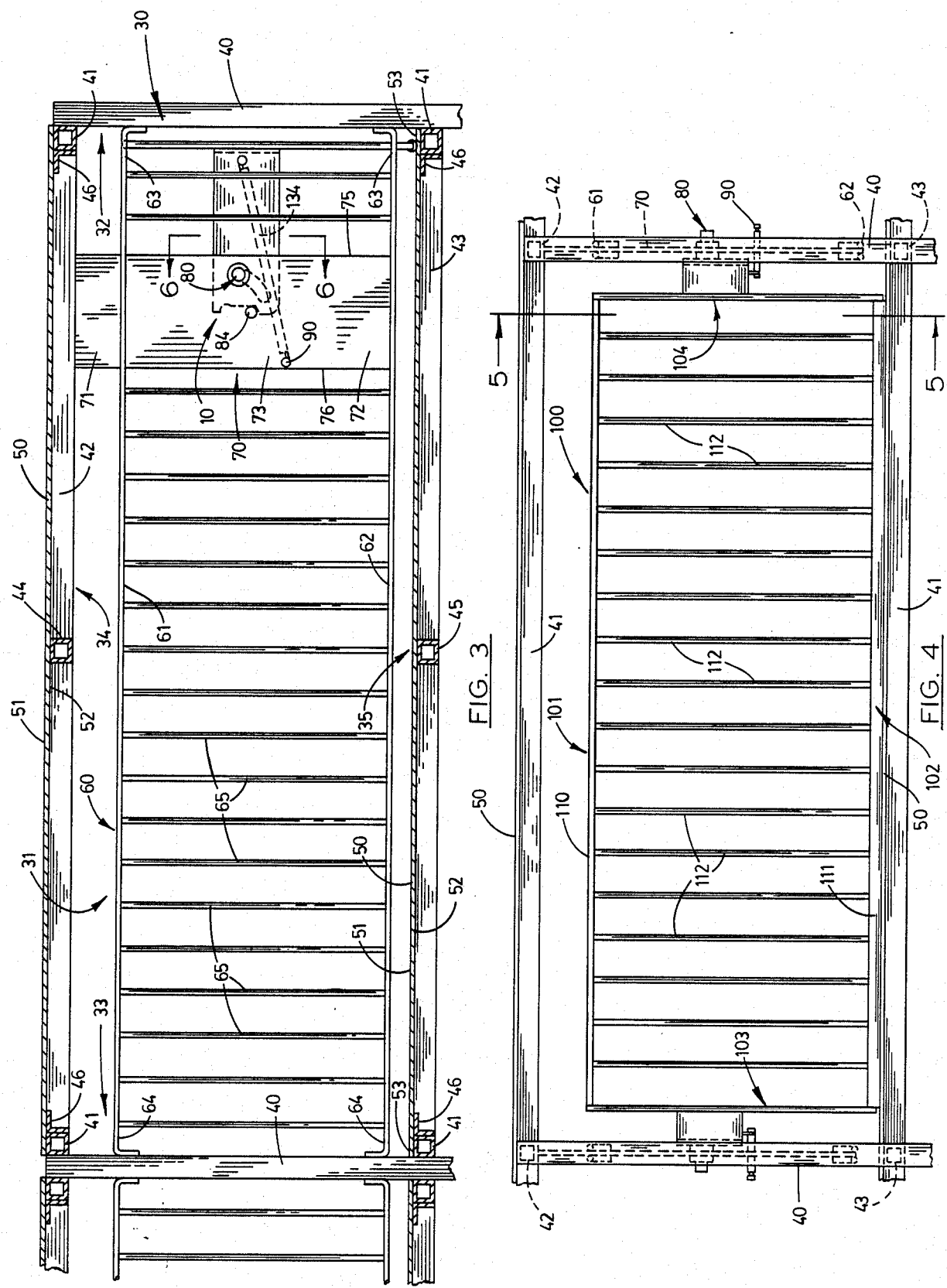

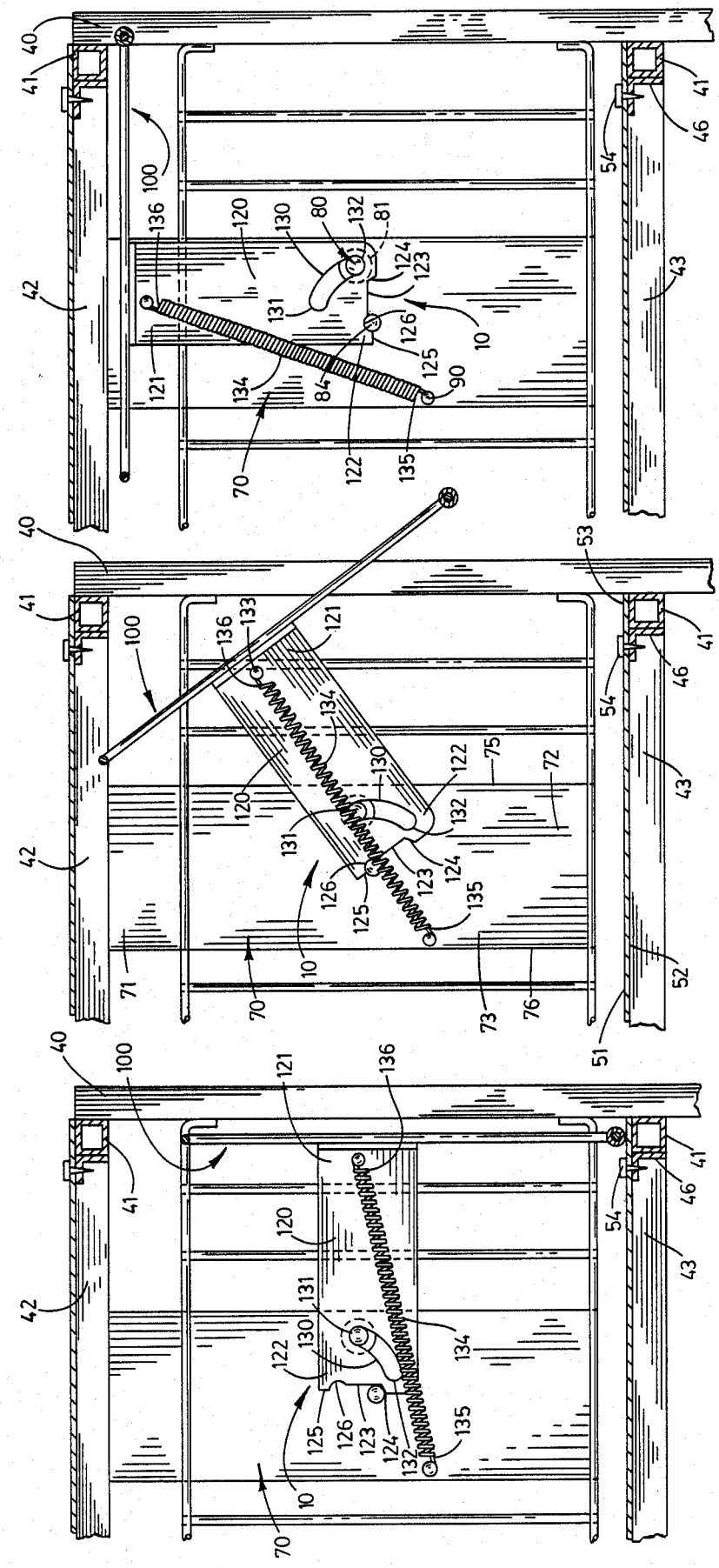

APPARATUS FOR MOUNTING A CLOSURE ON A HOUSING OR THE LIKE AND A CONFINING ASSEMBLY

BACKGROUND OF THE INVENTION

1. Field of the Invention

The present invention relates to an apparatus for mounting a closure on a housing or the like and a confining assembly and more particularly to such an apparatus which is inexpensive to construct and maintain and which is adapted to deploy the closure in a recessed attitude in both opened and closed positions, and which further positions the closure member in an opened position that defines the largest possible opening for access to the interior of the housing and the invention further-relates to a confining assembly having particular utility in the housing of a multiplicity of creatures such as poultry for such use as ground transport.

2. Description of the Prior Art

There are numerous situations in which the conventional interoperation of a closure and the structure on which it is mounted is less than satisfactory. The problems incident thereto are aggravated where there are a multiplicity of individual structures, or housings, and closures.

For example, it has long been the practice of poultry farmers to have their live poultry transported, such as to a slaughter house, utilizing a tractor-trailer rig particularly adapted for that purpose. In most situations, the trailer mounts a multiplicity of poultry cages which are employed individually to confine relatively small numbers of birds to prevent them from injuring themselves, or other birds, as they are being transported. Typically, the poultry cages are mounted in closely adjacent relation and each cage has an individual gate or closure which is selectively movable to confine the birds internally of the cage.

Such conventional tractor-trailer rigs produce numerous laudable results, including increasing the total number of fowl which can be transported simultaneously and protecting the birds from injury during such transport. However, they also suffer from a multiplicity of drawbacks which detract from their usefulness. These problems, experienced routinely and even when the cages are operating as intended, are thus particularly onerous.

For example, nearly all prior art poultry cages employ, in one form or another, a gate assembly that is adapted to allow access to the inside of the individual cage. However, these gate assemblies usually have a common shortcoming in that they are not adapted reliably to be retained in a closed position. As a result, users of such prior art cages have discovered that from time to time birds have escaped while being transported. In other instances, the gate assemblies have been damaged after opening prematurely while the vehicle is in motion. This is usually the result of the gate assembly coming into contact with an obstacle which brushes along the side of the trailer. Moreover, prior art poultry cages are difficult to repair when damaged and are not easily cleaned thereby promoting unsanitary conditions.

Still other significant problems with prior art poultry cages result from characteristics inherent in their design. The gate assemblies of such poultry cages are not recessed from the exterior surface of the trailer in the opened positions. Accordingly, the gate assemblies are chronically subject to damage even when operating as intended. In addition, the gate assemblies in their fully opened positions, though fully opened, nonetheless obstruct the openings of the cages. This results from the fact that gate assemblies in the fully opened positions are spaced downwardly from the tops of their respective cages relatively great distances. This makes loading and retrieval of the birds difficult for handlers. As importantly, loading and retrieval operations under such conditions are conducive to damaging the birds themselves.

Therefore, it has long been known that it would be desirable to have an apparatus for mounting a closure on a housing or the like which is particularly well suited to use on poultry cages; which dependably retains the closure in opened and closed positions at the selection of the operator; which is adapted to retain the closure in a fully recessed condition in both the opened and closed positions; and which in the opened position retains the closure in position to define the largest possible opening to facilitate access to the interior of the housing on which it is mounted. Further, it has long been known that it would be desirable to have an improved confining assembly having particular utility in the housing of creatures such as poultry.

SUMMARY OF THE INVENTION

Therefore, it is an object of the present invention to provide an improved apparatus for mounting a closure on a housing or the like.

Another object is to provide such an apparatus which is particularly well suited to use on poultry cages in mounting the gate assemblies thereof for movement between opened and closed positions.

Another object is to provide such an apparatus which retains the closure for movement between opened and closed positions both of which are fully recessed from the outside surface of the housing.

Another object is to provide such an apparatus which positions the closure in the opened position to define the largest possible opening to facilitate access to the housing.

Another object is to provide such an apparatus which permits the closure easily to be released from the housing upon which it is mounted for purposes of maintenance, modification and the like.

Another object is to provide such an apparatus which is characterized by ease of installation, simplicity of construction and which can be sold and installed at a moderate expense.

Another object is to provide such an apparatus which securely and reliably maintains the closure member in either the opened or closed positions at the selection of the operator.

Another object is to provide an improved confining assembly having particular utility in the housing of creatures such as poultry.

Further objects and advantages are to provide improved elements and arrangements thereof in an apparatus for the purposes described which is dependable, economical, durable, and fully effective in accomplishing its intended purposes.

These and other objects are achieved in the apparatus for mounting a closure on a housing or the like of the present invention wherein in the preferred embodiment the closure is mounted on two arm members that have camming surfaces and arcuate guide channels formed therein operating with cooperative guide pins borne by the housing and springs biasing the arm members into positions in engagement with the guide pins to retain the closure, at the selection of the operator, in the opened and closed positions and, when in the opened position, fully recessed within the housing and in very close proximity to the top of the housing.

BRIEF DESCRIPTION OF THE DRAWINGS

FIG. 3 is a somewhat enlarged, fragmentary, transverse, vertical section taken on line 3—3 in FIG. 1.

FIG. 4 is a somewhat enlarged, fragmentary, side elevation taken on line 4—4 in FIG. 2.

FIG. 5-A is a somewhat further enlarged, fragmentary, transverse, vertical section taken on line 5—5 in FIG. 4, with the gate assembly of the subject invention deployed in a closed position.

FIG. 5-B is a somewhat enlarged, fragmentary, transverse, vertical section taken from a position indicated by line 5—5 in FIG. 4 with the gate assembly of the subject invention deployed in a partially opened attitude for illustrative convenience.

FIG. 5-C is a somewhat enlarged, fragmentary, transverse, vertical section taken from a position indicated by line 5—5 in FIG. 4 with the gate assembly of the subject invention deployed in an opened position for illustrative convenience.

DESCRIPTION OF THE PREFERRED EMBODIMENT

Figure 1:
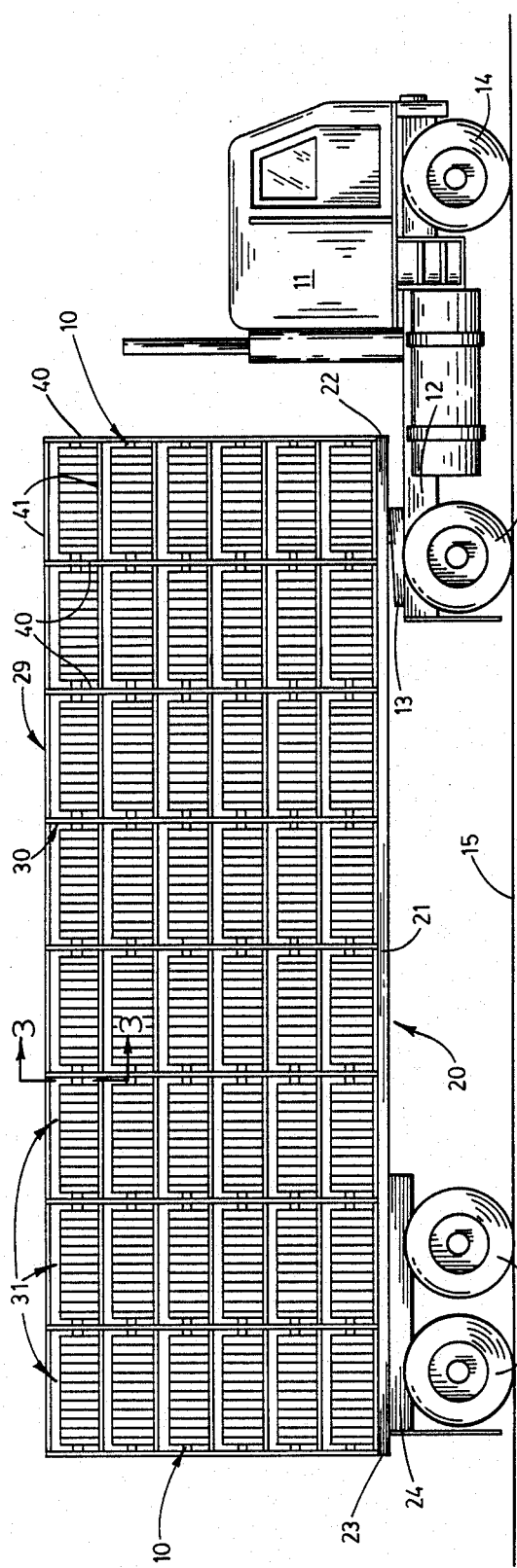
FIG. 1 is a side elevation of the apparatus for mounting a closure on a housing or the like of the present invention in a typical operative configuration deployed in multiples in a unitary stacked configuration on the bed of a trailer so as to form a trailer assembly appropriate for hauling poultry and which serves as a confining assembly of the type of the present invention.
Figure 2:
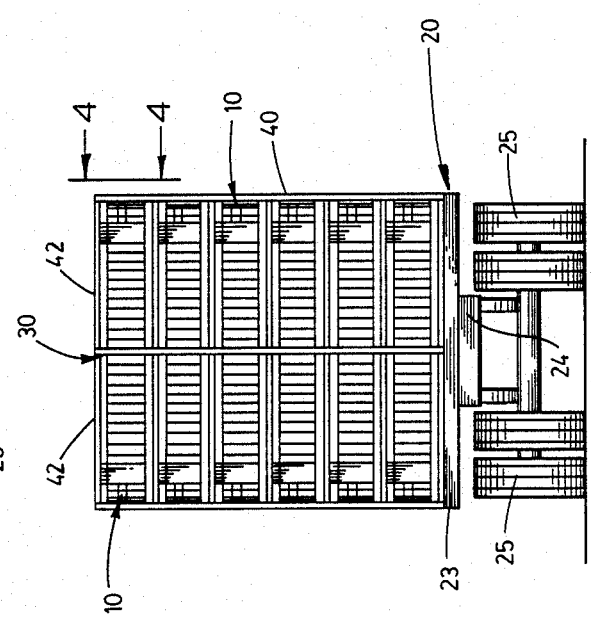
FIG. 2 is a rear elevation of the trailer assembly of FIG. 1.

Referring more particularly to the drawings, the apparatus for mounting a closure on a housing or the like embodying the principles of the present invention is generally indicated by the numeral 10 in FIG. 1. For illustrative convenience, a plurality of the apparatuses 10 are shown and described herein in a typical operative environment. More specifically, as shown in FIGS. 1 and 2, the apparatuses of the present invention are shown mounting gate assemblies on poultry cages in a unitary multiple cage structure employed for hauling live poultry along roadways, as will hereinafter be described in greater detail. As such, it constitutes an embodiment of the confining assembly of the present invention.

The multiple cage structure, as shown in FIGS. 1 and 2, is propelled in earth traversing movement by a tractor 11 or the like. The tractor is of entirely conventional design and construction having several frame members 12, only one of which is shown, which mount a hitch assembly 13. The frame members mount a plurality of ground engaging wheels 14 which rest in contact with the surface of the earth 15.

The hitch assembly 13 is shown in FIG. 1 with a trailer 20 connected thereto. The trailer itself, separate and apart from the multiple cage structure is of conventional design having a bed 21, a first end 22 and an opposite second end 23. Mounted on the bed of the trailer in close proximity to the second end is a suspension frame 24 which in turn mounts ground engaging wheels or wheel assemblies 25.

The apparatus 10, as previously noted, is shown and described herein in a multiple cage structure employed in the transportation of poultry. The multiple cage structure is generally indicated by the numeral 29. The multiple cage structure has a lattice-like frame 30 mounted on the bed 21 of the trailer 20. The frame is preferably manufactured of standard gauge, tubular steel stock which is first cut to predetermined lengths and thereafter welded together to form a multiplicity of poultry cage positions or poultry cages 31. As visible by reference to FIGS. 1 and 2, the poultry cages so defined are arranged in seven vertical rows of six poultry cages each on each side of the bed of the trailer. The rows of poultry cages on each side of the trailer are positioned back-to-back.

As best understood by reference to FIG. 3, each cage position or poultry cage 31 has a front portion 32, an opposed rearward portion 33, a ceiling 34, and a floor 35. The front and rearward portions of the poultry cages are each individually defined by two vertical frame members 40, and two horizontal frame members 41, respectively which are part of the lattice-like frame 30. The frame members 40 and 41 are welded together and interconnected by two substantially parallel longitudinal frame members 42 which form the ceiling of the cage positions and two longitudinal frame members 43 which form the floor of the poultry cage. A transverse frame member 44 interconnects the two longitudinal frame members 42 and a transverse frame member 45 joins the two longitudinal frame members 43 together to provide added strength. Attached in secure facing engagement with the horizontal frame members 41 are angle iron brackets 46. The frame members 40, 41, 42, 43, 44 and 45 thus define a box-like space for each poultry cage. The frame members are all part of the lattice-like frame 30. As can best be visualized in FIG. 3, depending upon where the specific poultry cage is in the row, the frame members 41, 43 and 45 of a poultry cage may actually be the frame members 41, 42 and 44 of the poultry cage below it in the row. As can be seen by reference to FIG. 1, this is the case for the specific poultry cage shown in FIG. 3. Of course, stated another way, the frame members 41, 42 and 44 of the poultry cage below, as viewed in FIG. 3 serve as the frame members 41, 43 and 45, as so numbered, for the poultry cage fully visible in FIG. 3.

Each of the poultry cages 31 has a floor 35 which is formed by a substantially planar, water resistant panel 50 which can be manufactured out of fiberglass and other similar material and which is of sufficient gauge and strength to support the fowl which will be enclosed in the individual poultry cages. The panel 50 has a front supporting or engagement surface 51 and an opposed back or ceiling surface 52. Each panel thus acts as the floor of one poultry cage and the ceiling 34 for the poultry cage immediately below it, except, of course, in the case of the lowest poultry cage in each row. The panel has a peripheral edge 53 which is appropriately affixed, by a rivet 54 or other suitable means on the angle iron brackets 46 as best shown in FIGS. 5-A through 5-C.

In the preferred embodiment, as can best be visualized in FIGS. 1 and 3, a single panel 50 extends the full length of the trailer bed 21 on each side of the bed to serve the described purpose for corresponding poultry cages at the same level in each vertical row. Such construction reduces the cost of construction, provides a smooth unobstructed surface the full length of the trailer at each level to facilitate cleaning with a water spray directed thereagainst, is stronger, and can easily be removed for replacement simply by removing the rivets and sliding it rearwardly from the trailer.

As best understood by reference to FIG. 3, each poultry cage 31 is individually provided with two fences or side walls 60. Each side wall has a first horizontal bar 61 and a second horizontal bar 62. Each of the horizontal bars has a first end 63 and an opposite second end 64. The first and second ends are welded on the vertical frame members 40 to mount the side wall in position interconnecting the frame members 40 and disposed in spaced, substantially parallel relation to each other and to the panels 50. Positioned and secured in substantially vertical attitudes and in equidistant positions along the first and second horizontal bars are a multiplicity of restraining bars 65. The restraining bars are spaced a predetermined distance apart such that the birds confined to the poultry cage are prevented from extending their heads and necks through the restraining bars and into the adjoining pourltry cage. Three is, however, a gap in each side wall adjacent to the front portion of the poultry cage in which there are no restraining bars. The gap can be seen in FIGS. 3, and 5-A through 5-C. Each poultry cage preferably has a back wall, not shown, which is positioned between the vertical frame member 40 which forms the rearward portion 33 of the poultry cage. The back wall is of similar design and configuration as that of the previously described side walls 60. In other instances, no such back wall is used so that corresponding poultry cages on opposite sides of the trailer 20 are simply disposed in back-to-back relation.

The apparatus 10 of each poultry cage 31 has a mounting plate 70 which is positioned in the gap in each side wall closely adjacent to the front portion 32 of the cage, as shown in FIG. 3. The mounting plate, which is preferably manufactured of a suitable metal, has a first end 71 which is mounted on the longitudinal frame member 42 thereabove and an opposite second end 72, which is mounted on the second horizontal bar 62 therebelow, which forms a portion of the side wall 60. As shown in hidden lines in FIG. 4, each mounting plate 70 is preferably mounted by welding between two side walls of adjoining poultry cages disposed in side-by-side relation. However, it may be preferred that a single side wall serve adjoining poultry cages and in such a case the mounting plate is simply welded in the described position on the single side wall. In both cases, the mounting plate operates, as will be described, to mount structures for both adjoining poultry cages. There are two mounting plates serving each poultry cage, one on each side wall.

Figure 6:
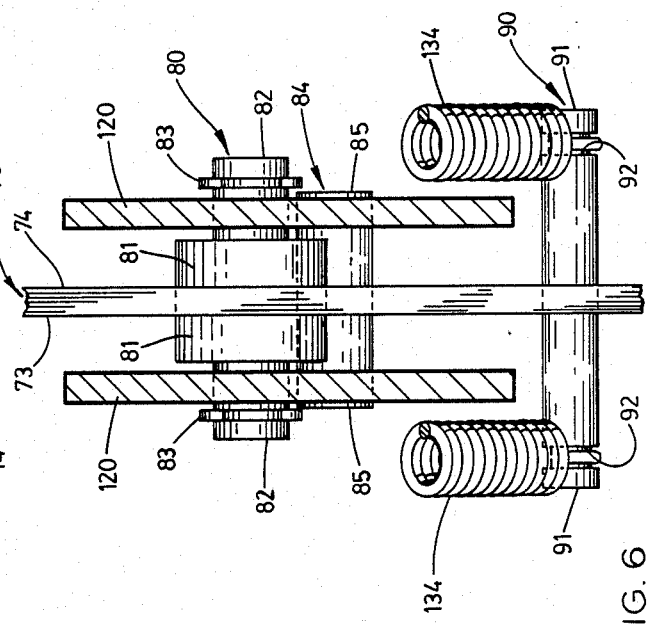
FIG. 6 is a somewhat further enlarged, fragmentary, vertical section taken on line 6—6 in FIG. 3.

As shown in FIGS. 3 and 6, each mounting plate 70 has an inside surface 73 and an opposed outside surface 74. The mounting plate further has a leading edge 75 and an opposed trailing edge 76. The mounting plate is adapted to receive, and deploy in a predetermined attitude, a guide pin 80 which is received through the mounting plate. The guide pin when deployed in such a fashion extends a predetermined distance outwardly from, and normal to, the inside and outside surfaces of the mounting plate, respectively. The guide pin has cylindrically shaped spacer portions 81 which are mounted on the mounting plate, and distal receiving ends 82, which are also cylindrical in cross-section, but which are somewhat smaller in diameter. The distal receiving ends are adapted individually to receive locking clips or other fasteners 83.

As best understood by reference to FIG. 6, each mounting plate 70 mounts a cylindrically shaped pivot pin 84 in an attitude, which is normal to the inside and outside surfaces 73 and 74, respectively, of the mounting plate. The pivot pin 84 has distal end portions 85. In similar fashion, the mounting plate has mounted thereon a spring anchor pin 90; the spring anchor pin being positioned in closely adjacent spaced relation to the trailing edge 76 of the mounting plate, as best shown in FIGS. 5-A through 5-C. The spring anchor pin has distal ends 91 which have formed therein annular spring seats 92. The spring anchor pin is somewhat longer than the pivot or guide pin 80 that are also mounted on the mounting plate. The spring anchor pin and pivot pin are appropriately affixed to the mounting plate by welding or the like. Thus, as shown in FIG. 6, each mounting plate mounts a guide pin 80, pivot pin 84 and spring anchor pin 90 having ends extending in opposite directions from the mounting plate to serve adjoining poultry cages.

As shown in FIG. 4, the apparatus 10 of each poultry cage 31 has a gate assembly or closure 100. The gate assembly has a top portion 101, an opposed bottom portion 102, a first end 103 and a second end 104. The gate assembly has a first horizontal bar 110 and a second horizontal bar 111, which are interconnected by a multiplicity of bars 112. The bars are spaced a predetermined distance apart to prevent the birds which are being transported in the poultry cage 31 from sticking their heads through and past the bars.

Individually mounted on the first and second ends 102 and 103, respectively, of the gate assembly 100 are two individual arm members of substantially right-angulated configurations 120. The arm members 120 individually, operatively interconnect the gate assembly to the mounting plates 70. As best shown in FIGS. 3 and 5-A through 5-B, each arm member has a leading or proximal end 121, and a trailing or distal end 122. Only one arm member is shown in FIG. 3, it being understood that a corresponding arm member is located in a corresponding attitude on the first end 102 of gate assembly and is the mirror image of the arm member shown. As shown in FIG. 4, the proximal ends of the arm members of each poultry cage are mounted on the first and second ends of the gate assembly respectively, and are disposed in right angular relation to the gate assembly.

As can best be seen by reference to FIGS. 5-A, 5-B and 5-C, the distal ends of the individual arm members have formed therein a recessed camming surface 123 which slidably rests in contact with the pivot pin 84. The recessed camming surface has a first end 124 and a second end 125. Positioned closely adjacent to the second end of the recessed camming surface is a depression or cradle 126 which receives and closely holds the pivot pin when received therein.

An arcuate guide channel 130 extends through the arm member 120 in a position closely adjacent to the recessed camming surface as best shown in FIGS. 5-A through 5-C. Each arm member is mounted on its respective mounting plate 70 by the guide pin 86 extending therethrough so that the arm member is movable along a substantially pivotal path through the positions shown in FIGS. 5-A through 5-C as controlled in part by the configuration of the arcuate guide channel. The guide channel has a first end 131 and a second end 132. It should be understood that the arcuate guide channel and recessed camming surface cooperatively limit and define the opening movement of the closure member from a closed position which is best illustrated in FIG. 5-A, to an open position, which is best seen in FIG. 5-C. This cooperation of the arcuate guide channel and recessed camming surface causes the gate assembly 100 to be deployed in a recessed attitude in both the open and closed positions. In the opened position, the gate assembly is spaced from the panel 50 below serving as the floor of that cage assembly to an extent not heretofore achieved in the art. In its recessed attitudes, both when opened and closed, the gate assembly is protected from damage that could be caused by an obstacle brushing along the outside of the lattice-like frame 30.

As shown in FIG. 5B, the individual arm members 120 mount an attachment pin 133 in a position located closely adjacent to the proximal end 121. The attachment pin is adapted operably to receive a tension spring 134 which biases the individual arm members into an operative relationship with their respective poultry cages 31. The tension spring has a first end 135 which is operably interconnected with a spring anchor pin 90 and an opposite second end 136 which is operably connected to attachment pin 133. It should be understood that the tension spring causes the individual arm members operatively to engage the pivot pin 84 and guide pin 80 and also permits the gate assembly 100 to be securely retained in either an opened or closed attitude; this is best seen by reference to FIGS. 5-A and 5-C.

OPERATION

The operation of the described embodiment of the present invention is believed to be readily apparent and is briefly summarized at this point.

The apparatus 10 for mounting a closure 100 on a housing such as a poultry cage 31, operatively defines the opened and closed positions, for the closure as well as the path of movement taken by the closure in moving between those positions. This is illustrated most clearly in FIGS. 5-A, 5-B and 5-C. As best seen by reference to FIG. 1, a multiplicity of poultry cages 31 are defined and disposed in juxtaposed attitudes in the lattice-like frame or housing 30 which is borne by the trailer 20.

When the gate assembly 100 is manually urged to the opened position from the closed position, the arm members 120 of the gate assembly initially revolve about the guide pin 80, which is positioned at the first end 131 of the arcuate guide channel 130. Simultaneously with this rotation, the recessed camming surface 123 is urged from a first position, wherein the pivot pin 84 is located at the first end 124 of the recessed camming surface 123; to a second position, wherein the pivot pin is and into registry with the cradle 126. The pivot pin, upon reaching the second end of the recessed camming surface, thereafter induces the individual arm members thereafter simultaneously to revolve about the pivot pin itself. This is best illustrated by reference to FIG. 5-B. As the individual arm members revolve about their respective pivot pins, the arcuate guide channels simultaneously are caused to be moved from first positions, wherein the guide pins 80 are located at the first ends 131 of the arcuate guide channels 130, to second positions wherein the guide pins are positioned at the second ends 132 of the guide channels. The arcuate guide channels, upon reaching the second positions present the individual arm members in the upright attitude shown in FIG. 5-C thereby supporting the gate assembly in the fully opened position also shown therein. In the opened position, the gate assembly defines the largest possible opening to the interior of the poultry cage. Similarly, it will be seen that the apparatus of the subject invention permits the gate assembly to be recessed in both the opened and closed positions thereby reducing to a minimum the likelihood of damage to the gate assembly.

As can be visualized in FIGS. 5-A and 5-C, the position of the spring relative to the guide and pivot pins 80 and 84 respectively, is that similar to an "over center" mechanism so that the gate assembly is dependably retained in both the opened and closed positions at the selection of the operator. Similarly, as can be seen by studying FIGS. 5-A through 5-C, the guide channel 130, camming surface 123 and the guide and pivot pins operate cooperatively as described so that the gate assembly g is nearer the guide pin 80 in the closed position of FIG. 5-A than in the opened position of FIG. 5-C. This action achieves the recessing of the gate assembly in both the opened and closed positions as well as defining the largest possible opening for access to the interior of the poultry cage in the opened position.

Therefore, the apparatus for mounting a closure on a housing or the like is particularly well suited to use on poultry cages; dependably retains the closure in both opened and closed positions at the selection of the operator; maintains the closure in a fully recessed attitude in both the opened and closed positions; and in the opened position retains the closure in such a position as to define the largest possible opening for access to the interior of the housing.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus for mounting a closure on a poultry housing or the like having an entrance, a floor and a ceiling, the apparatus comprising:
    A. an arm member mounted on the closure; and
    B. means interconnecting the arm member and the housing to support the closure in said entrance for movement along a path of travel between a closed position substantially obstructing said entrance and an opened position wherein said entrance is substantially unobstructed, said interconnecting means including,
        1. first and second surfaces, said first surface being farther from the closure than the second surface and said first and second surfaces being nearer each other at predetermined ends than at opposite predetermined ends; and
        2. first and second pins, said first pin being farther from the closure than the second pin, individually engaging and movable relative to and along, respectively, said first and second surfaces from respective opposite ends thereof, said first and second surfaces and said first and second pins being so positioned that during movement of said closure along said path of travel from said closed position to said opened position in a first portion of said path of travel the arm member, and thereby the closure, pivots about the second pin and the first pin travels relative to and along said first surface to a pivot position relative to said first surface which is farther from said closure than said second pin so that during movement of said closure in a second portion of said path of travel, the arm member, and thereby the closure, pivots about the first pin to position said closure in close proximity to the ceiling of the housing.

2. The apparatus of claim 1 including means resiliently biasing the closure in said closed position.

* * * * *

UNITED STATES PATENT AND TRADEMARK OFFICE
CERTIFICATE OF CORRECTION

PATENT NO. : 4,831,966
DATED : May 23, 1989
INVENTOR(S) : Clifford H. Tutelian

It is certified that error appears in the above-identified patent and that said Letters Patent is hereby corrected as shown below:

Column 7, Line 54

After "is" and before "and" insert

---positioned at the second end 125
           of the recessed camming surface,---.

Signed and Sealed this
Ninth Day of January, 1990

*Attest:*

JEFFREY M. SAMUELS

*Attesting Officer*      *Acting Commissioner of Patents and Trademarks*